F. F. STRATTON.
CHANGE SPEED GEAR MECHANISM FOR MOTOR VEHICLES.
APPLICATION FILED MAR. 17, 1914.
1,095,129.
Patented Apr. 28, 1914.
2 SHEETS—SHEET 1.
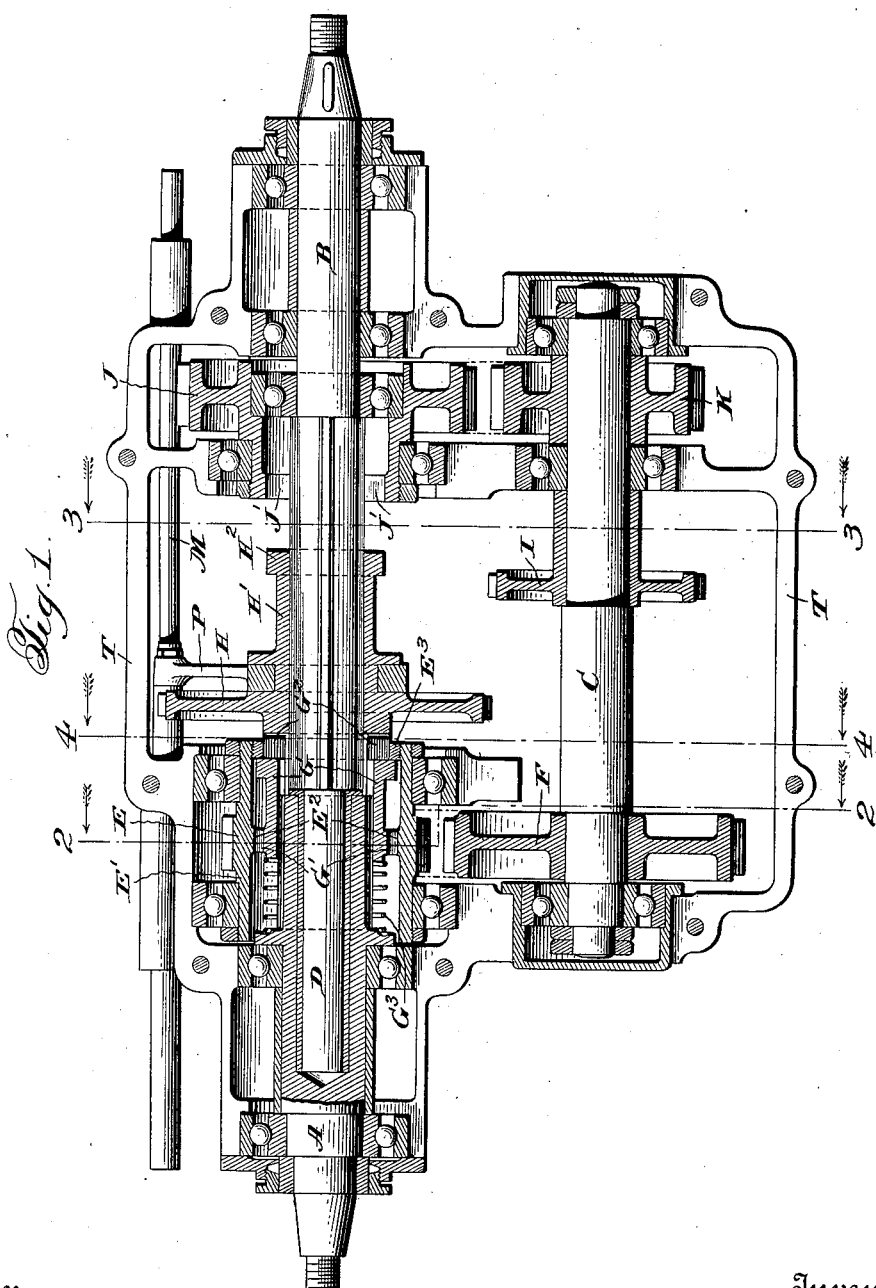

F. F. STRATTON.
CHANGE SPEED GEAR MECHANISM FOR MOTOR VEHICLES.
APPLICATION FILED MAR. 17, 1914.
1,095,129.
Patented Apr. 28, 1914.
2 SHEETS—SHEET 2.
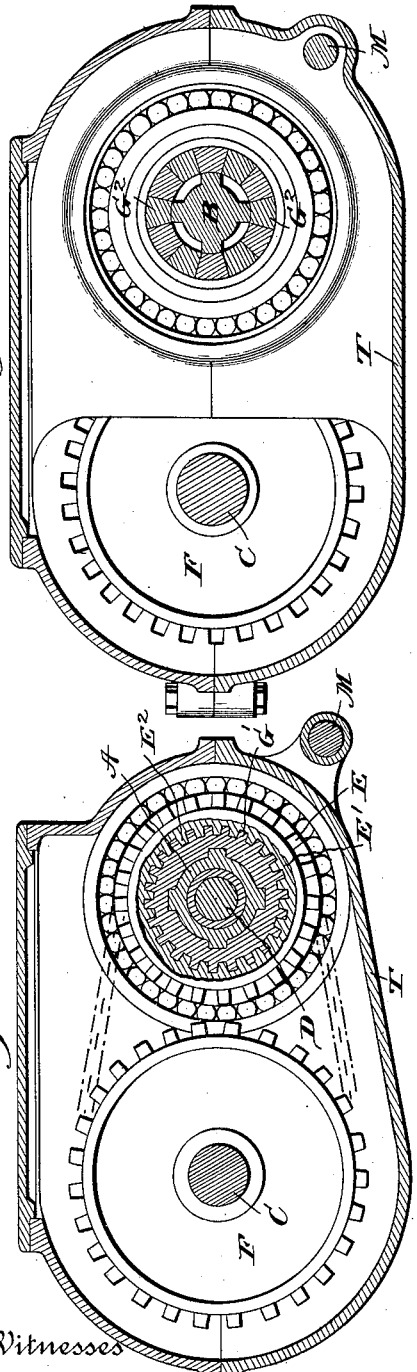
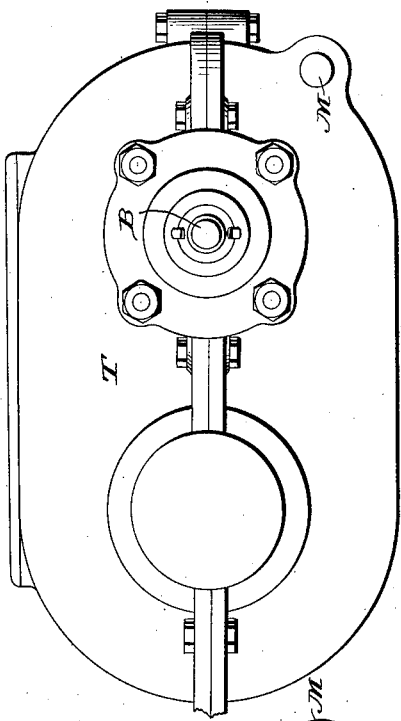
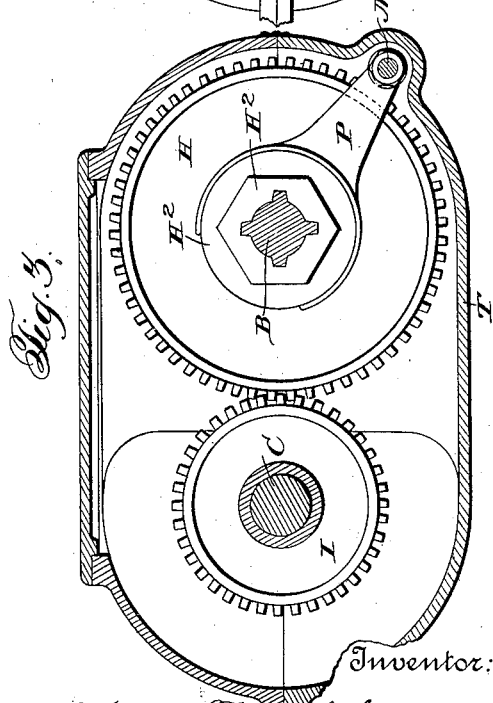

UNITED STATES PATENT OFFICE.

FENTON FREDERICK STRATTON, OF EAST CROYDON, ENGLAND.

CHANGE-SPEED-GEAR MECHANISM FOR MOTOR-VEHICLES.

1,095,129.  Specification of Letters Patent. Patented Apr. 28, 1914.

Application filed March 17, 1914. Serial No. 825,349.

*To all whom it may concern:*

Be it known that I, FENTON FREDERICK STRATTON, a subject of the King of Great Britain, and a resident of Oak Lodge, Park Hill Road, East Croydon, Surrey, England, have invented new and useful Improvements in or Relating to Change-Speed-Gear Mechanism for Motor-Vehicles, of which the following is the specification.

This invention relates to improvements in change speed gearing for motor vehicles.

In gearing as generally constructed, the secondary or lay shaft and the gear wheels in connection therewith, and mounted thereon, are in continual rotation when the direct or through drive is in operation. This causes unnecessary wear and noise as well as loss of power due to friction, and this idle running is particularly disadvantageous when chains are employed, as it materially decreases the life of the chain.

The chief object of this invention is to provide such a construction and arrangement of gearing that during the direct drive the secondary or lay shaft, and the chain gear in connection therewith will remain stationary.

According to my invention I provide a casing of usual construction, a driving shaft extending a short distance thereinto, and mounted preferably in ball bearings in said casing, a driven shaft mounted coaxially and in alinement with the driving shaft, one of the said shafts being formed with an extension fitting a recess in the other shaft in the usual manner, thus forming a bearing for the alining connection between the two shafts. I provide a lay shaft of usual construction mounted parallel to said driving and driven shafts and mounted between bearings, preferably ball in the said casing. This shaft is provided with preferably, two chain wheels for forward drive, and one spur wheel for reverse. I provide a sprocket wheel mounted concentrically surrounding the driving shaft in suitable bearings in such a manner that it is free to rotate independently of this driving shaft. The said sprocket wheel is connected by chain, preferably of the silent type, with said corresponding driven sprocket mounted upon the lay shaft.

The driving shaft having the extension of the driven shaft within it is splined or is formed of square or hexagonal section, upon which section a jaw clutch is adapted to slide. The sleeve of the said sliding jaw clutch has dog teeth or a hexagon formed upon its external face, which teeth or hexagon are adapted to engage similar internally projecting teeth or a hexagon formed upon the interior or inner surface of the sleeve of the said loose sprocket. A spring is provided to keep the said dog teeth or hexagon portions in engagement. The driven shaft is similarly splined or formed of square or hexagonal section, and mounted thereon I provide a second sliding clutch, the jaws of which are adapted to engage the corresponding jaws of the sliding clutch on the driving shaft. The other end of the said sliding clutch is provided with a second clutch member, which consists of a hexagon or the like formed on the external face of the jaw clutch sleeve, which hexagon or the like is adapted to engage an internally formed corresponding hexagon or the like on the interior surface of a loose sprocket wheel mounted in bearings coaxially with the driven shaft. This second sprocket is connected by means of a chain to one of the said sprockets on the lay shaft in the usual manner. These sprockets and chain when brought into operation provide the second speed as hereafter described.

For the maximum or direct drive, the jaws of the sliding jaw clutch mounted upon the driven shaft, are moved into engagement with the clutch upon the driving shaft, and the said sliding clutch is moved compressing the said spring pushing the teeth formed on the end of the driving clutch sleeve out of engagement with the loose sprocket wheel, thereby causing the driven and the driving shafts to be locked together and they are then quite independent of the lay shaft, and the chain wheels connecting thereto; the said parallel or lay shaft then remains stationary. When it is desired to run the gearing at the second speed, the sliding clutch upon the driven shaft is moved in the opposite direction to that before described, and out of engagement with the clutch on the driving shaft, when the said spring causes the teeth upon the driving clutch to reëngage with the loose sprocket wheel mounted in bearings surrounding it, thereby bringing this sprocket wheel into engagement with the driving shaft, and so transmitting power through the lay shaft. On the driven sliding clutch being moved farther in the said direction, the hexagon or the like on the end of the said clutch, engages the said internal hexagon on the interior surface of the second loosely mounted sprocket wheel concentric with the driven shaft, which being in continual engagement with the lay shaft, causes the driven shaft to be rotated at the slower speed. On the sliding clutch member being moved to its fullest extent in the said direction, the hexagon or the like formed on its end is moved out of engagement with the corresponding hexagon of the slow speed chain wheel, when the spur wheel mounted upon the said driving clutch member, is adapted to engage a spur pinion secured to the lay shaft, thus effecting the reverse drive.

The sliding clutch driven member is operated by means of a fork of usual construction mounted upon a longitudinal rod or shaft passing through the casing. The said sliding or operating rod or shaft may be operated in any suitable manner by the driver of the vehicle. And in order that my invention may be completely understood, reference should be made to the accompanying sheets of drawings which illustrate one example thereof:—

Figure 1 is a plan of the lower portion of the box, the upper part or cover being removed, the sprockets and gear wheels being shown in section. Fig. 2 is a section on the line X X of Fig. 1. Fig. 3 is a section on the line Z Z of Fig. 1. Fig. 4 is a section on the line Y Y of Fig. 1. Fig. 5 is an end elevation of the gear casing.

A is the driving shaft having connected thereto the engine clutch inner cone or the like means of transmitting its power.

B is the driven or propeller shaft, and C is the lay shaft. The shaft B is provided with the extension D fitting within the hollow end or sleeve of the shaft A with a bearing bush between them. The chain wheel E is formed integrally with the sleeve $E^1$ which is mounted on its exterior in ball bearings, and is connected by chain indicated by dotted lines with the chain wheel F on the lay shaft. The interior of the sleeve $E^1$ is provided with clutch teeth $E^2$ adapted to engage with corresponding clutch teeth $G^1$ on the inner sleeve G. The clutch sleeve G is also provided at its end with the jaw clutch teeth $G^2$ adapted to engage with corresponding teeth upon the sleeve $H^1$ which as shown is integrally formed with the gear wheel H. The sleeve G is splined to the driving shaft A, the sleeve $H^1$ is splined to the driven shaft B. The spring $G^3$ normally holds the clutch teeth $E^2$ and $G^1$ in engagement, the screwed ring $E^3$ being fitted to act as a stop to the sleeve $E^1$. The gear wheel H is adapted to engage when moved along the driven shaft B the teeth of the gear wheel I on the lay shaft. The clutch sleeve $H^1$ is provided with a second clutch member $H^2$, which preferably consists of a hexagon or the like formed on its external face. The said hexagon $H^2$ is adapted to engage an internally formed hexagon or the like $J^1$ formed on the interior surface of the sleeve of the chain wheel J. The chain wheel which surrounds concentrically and is adapted to rotate independently of the shaft B is connected by chain also indicated by dotted lines Fig. 1, to the chain wheel K. Both the chain wheels F and K and the gear wheel I are keyed to the lay shaft C.

For the maximum or direct drive the jaws of the sliding sleeve or clutch $H^1$ are moved into engagement with the clutch teeth $G^2$ of the clutch sleeve G thereby causing the driving and driven shafts to be locked together. On further movement of the sliding clutch $H^1$, the clutch teeth $G^1$ on the clutch sleeve G are moved out of engagement with the clutch teeth $E^2$ of the chain wheel E against the action of the spring $G^3$, thereby allowing the driving shaft A and the driven shaft B to rotate quite independently of the lay shaft C.

When it is desired to run the gearing at the second speed, the sliding clutch $H^1$ is moved in the opposite direction to that before described causing the clutch teeth $G^1$ on the sliding clutch G to engage the clutch teeth $E^2$ of the chain wheel E thereby bringing the sprocket wheel E into engagement with the driving shaft A, and so transmitting power to the lay shaft C. On the sliding clutch $H^1$ being moved farther in the said direction, the clutch sleeve G being prevented from further movement by the stop ring $E^3$, the teeth on the sliding clutch $H^1$ are moved out of engagement with the teeth $G^2$, and the hexagon $H^2$ on the end of the said clutch engages the internal hexagon $J^1$ of the chain wheel J. The said chain wheel being connected by chain to the chain wheel K mounted on the lay shaft C, causes the driven shaft B to be rotated at the slower speed. On the sliding clutch $H^1$ being moved to its fullest extent in the said direction, the hexagon $H^2$ is moved out of engagement with the internal hexagon $J^1$ when the spur wheel H is adapted to engage the spur wheel I for effecting the reverse drive.

The sliding clutch sleeve $H^1$ is operated by means of the fork P mounted upon the longitudinal rod or shaft M passing through the casing T.

What I do claim as my invention and desire to secure by Letters Patent is:—

1. A change speed gearing including a drive shaft, a driven shaft in axial alinement with the drive shaft, the driven shaft being formed with a portion extending within the drive shaft, an inner sleeve splined on the drive shaft and having notches in the end thereof, a sleeve embracing the first mentioned sleeve, the inner sleeve being provided with clutch teeth which mesh with clutch teeth carried interiorly of the outer sleeve, a stop ring carried by one end of the outer sleeve, the drive shaft having a collar, a spring interposed between said collar and the inner sleeve, said spring normally forcing the sleeve into contact with the stop ring whereby the clutch teeth of the sleeves are maintained in mesh, a lay shaft, a sprocket fixed on the lay shaft, the outer sleeve having exterior teeth, a sprocket chain engaging said teeth and the sprocket wheel of the lay shaft, a gear wheel splined on the driven shaft and carrying teeth disposed to engage the notches in the inner sleeve whereby the shafts are locked together, means for moving said gear longitudinally of the driven shaft to force the meshing clutch sleeves of the inner and outer sleeves out of mesh against the tension of the spring, a sprocket wheel loosely mounted on the driven shaft, said gear wheel having means for locking the said sprocket wheel thereto, a sprocket wheel mounted on the lay shaft, a chain passing over the sprocket wheel of the driven shaft and that of the lay shaft, and a gear mounted on the lay shaft and disposed to be engaged by the sliding gear of the driven shaft whereby to cause a reverse movement of the said driven shaft.

2. A change speed gearing including a drive shaft, a driven shaft in axial alinement with the drive shaft, an inner sleeve splined on the driven shaft, an outer sleeve, there being clutch teeth arranged exteriorly of the inner sleeve which engage clutch teeth arranged interiorly of the outer sleeve, a stop ring carried by the outer sleeve and projecting inwardly of the same, means for normally maintaining the inner sleeve in contact with the stop ring whereby the clutch teeth of the sleeves are maintained in mesh, the inner sleeve being formed with a clutch face, a gear wheel splined on the driven shaft and including a hub portion with a clutch face, means for moving the gear wheel longitudinally of the driven shaft to bring the clutch face of the hub portion into locking engagement with the clutch face of the inner sleeve, a lay shaft, a sprocket wheel fixed to the lay shaft, a chain passing over said sprocket wheel and engaging teeth arranged exteriorly of the outer sleeve, a sprocket wheel loosely mounted on the driven shaft, a sprocket on the lay shaft, a chain passing over the sprockets of the lay and driven shafts, the hub of the gear wheel being formed with an extension provided with radial projections, the sprocket wheel of the driven shaft being formed with a hub portion provided with notches with which said radial projections engage whereby to lock said sprocket to the gear wheel, the hub of the sprocket having a bore of such diameter whereby the extension of the gear wheel may be projected within the same and brought out of the notches formed in the sleeve and a gear wheel mounted on the lay shaft and engaged by the gear wheel of the driven shaft when the extension of the second mentioned gear wheel is projected within the bore of the driven sprocket.

FENTON FREDERICK STRATTON.

Witneses:
JOSEPH H. STRATTON,
GEORGE I. BRIDGES.

Copies of this patent may be obtained for five cents each, by addressing the "Commissioner of Patents, Washington, D. C."